(12) United States Patent
Xia et al.

(10) Patent No.: US 10,410,416 B2
(45) Date of Patent: Sep. 10, 2019

(54) COLLECTIVE NAVIGATION FOR VIRTUAL REALITY DEVICES

(71) Applicant: Futurewei Technologies, Inc., Plano, TX (US)

(72) Inventors: Yinglong Xia, San Jose, CA (US); Lei Rao, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 46 days.

(21) Appl. No.: 15/247,801

(22) Filed: Aug. 25, 2016

(65) Prior Publication Data

US 2018/0061125 A1 Mar. 1, 2018

(51) Int. Cl.
*G06T 19/00* (2011.01)
*G06F 3/01* (2006.01)
*G06T 7/73* (2017.01)

(52) U.S. Cl.
CPC ............ *G06T 19/003* (2013.01); *G06F 3/011* (2013.01); *G06T 7/75* (2017.01)

(58) Field of Classification Search
None
See application file for complete search history.

(56) References Cited

U.S. PATENT DOCUMENTS 6,271,842 B1 8/2001 Bardon et al.

| | | | |
|---|---|---|---|
| 2010/0036606 A1* | 2/2010 | Jones | G01C 21/3446 701/533 |
| 2011/0276263 A1* | 11/2011 | Shimotani | G01C 21/32 701/532 |
| 2012/0142415 A1* | 6/2012 | Lindsay | G06T 19/006 463/33 |

(Continued)

FOREIGN PATENT DOCUMENTS

CN 204142259 U * 2/2015
CN 201420649911 A 2/2015

OTHER PUBLICATIONS

Ghosh, R. K., et al., "Indoor navigation system using optical mouse sensor and smartphone", *2014 International Conference on Indoor Positioning and Indoor Navigation (IPIN)*, (Oct. 2014), 426-430.

(Continued)

*Primary Examiner* — Xiao M Wu
*Assistant Examiner* — Steven Z Elbinger
(74) *Attorney, Agent, or Firm* — Schwegman Lundberg & Woessner, P.A.

(57) ABSTRACT

A computer-executed method is disclosed for collective navigation of distributed virtual reality (VR) devices. The method obtains a source vertex and a destination vertex for a VR device. The source vertex and the destination vertex include vertices of a graph model of a navigable space having a plurality of vertices. The vertices represent a point within the navigable space and the plurality of edges represent a path segment between two corresponding vertices. A subset of possible vertices, selected from the plurality of vertices, is determined for a navigable path. A vertex traffic potential is determined for each vertex of the subset of possible vertices. The navigable path, including one or more consecutive path segments selected to minimize both segment path lengths and vertex traffic potentials, is determined from the source vertex to the destination vertex.

25 Claims, 7 Drawing Sheets

(56) References Cited

U.S. PATENT DOCUMENTS

| | | | |
|---|---|---|---|
| 2013/0013204 A1* | 1/2013 | Kazama | G01C 21/20 |
| | | | 701/533 |
| 2015/0137967 A1* | 5/2015 | Wedig | G08B 25/016 |
| | | | 340/501 |
| 2016/0252355 A1* | 9/2016 | Mays | G01C 21/206 |
| | | | 701/533 |
| 2017/0131104 A1* | 5/2017 | Carter | G01C 21/20 |
| 2017/0146353 A1* | 5/2017 | Kroeller | G01C 21/3415 |
| 2017/0227367 A1* | 8/2017 | Thangaraj | G06Q 30/0631 |
| 2017/0309172 A1* | 10/2017 | Linder | G08G 1/0133 |
| 2017/0343364 A1* | 11/2017 | Mutsuga | G08G 1/137 |

OTHER PUBLICATIONS

Zheng, Yuanqing, et al., "Travi-Navi: Self-deployable Indoor Navigation System", *Proceedings of the 20th Annual International Conference on Mobile Computing and Networking (MobiCom '14)*, (2014), 471-482.

* cited by examiner

COLLECTIVE NAVIGATION FOR VIRTUAL REALITY DEVICES

TECHNICAL FIELD

The present disclosure is related generally to virtual reality (VR) devices and in particular to collective navigation for virtual reality devices.

BACKGROUND

VR is a computer technology that replicates an environment, real or imagined, and simulates a user's physical presence and environment to allow for user interaction. VR headsets provide visual and audio information to the user in order to immerse the user in the desired environment. Some VR systems may provide tactile information, generally known as force feedback. VR systems are becoming increasingly popular in medical, gaming, or military applications.

VR navigation has been important for improving user experiences since guidance in the mixture of virtual and real environments can help increase the user's confidence. VR navigation is individually based. In other words, users wearing a VR headset are provided navigation information meant for their individual use. This may result in problems in a group of VR users.

SUMMARY

A computer-executed method is disclosed for collective navigation of distributed virtual reality (VR) devices. The method obtains a source vertex and a destination vertex for a VR device. The source vertex and the destination vertex include vertices of a graph model of a navigable space having a plurality of vertices and a plurality of edges. The vertices represent a point within the navigable space and the plurality of edges represent a path segment between two corresponding vertices. A subset of possible vertices is determined for a navigable path. The subset of possible vertices may be selected from the plurality of vertices. A vertex traffic potential is determined for each vertex of the subset of possible vertices. The navigable path is determined from the source vertex to the destination vertex. The navigable path includes one or more consecutive path segments selected to minimize both segment path lengths and vertex traffic potentials.

DETAILED DESCRIPTION

Some of the challenges noted above, as well as others, may be addressed by a method for collective navigation for VR device users. The collective navigation method determines a graph model for a navigable space and develops a navigation strategy to guide a VR user from one location to another. The method takes into account a maximum number of VR users allowed in the navigable space as well as movement of users between virtual structures and real structures in the navigable space.

The method for collective navigation for VR devices provides individual navigation for each VR user but it takes into account other VR users in a navigable space. Thus, VR users may use the provided navigation information to navigate the space while avoiding large groups in any one area of the navigable space. Additionally, since some VR users may choose to ignore the navigation information, the method updates dynamically as the users move through the space.

As defined herein, a "virtual structure" is any structure that is defined solely in software and can be presented to a VR user on the VR headset display. In other words, a VR user cannot physically touch a virtual structure but can physically touch a physical structure.

Each VR user, by definition, has a VR device. Thus, subsequent use of the term VR user is also defined as VR device.

Figure 1:
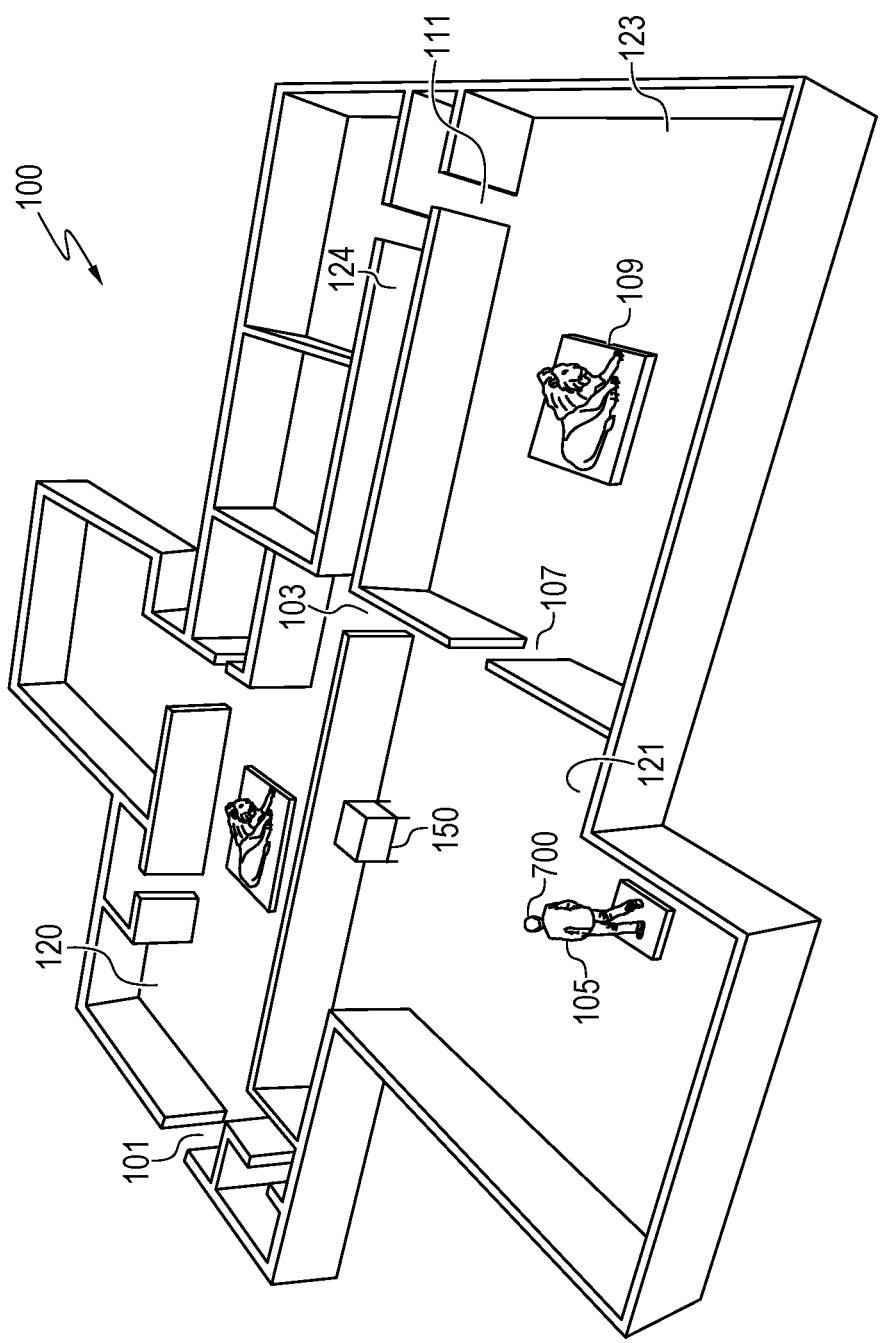
FIG. 1 is a diagram of a navigable space, in accordance with various embodiments.
Figure 7:
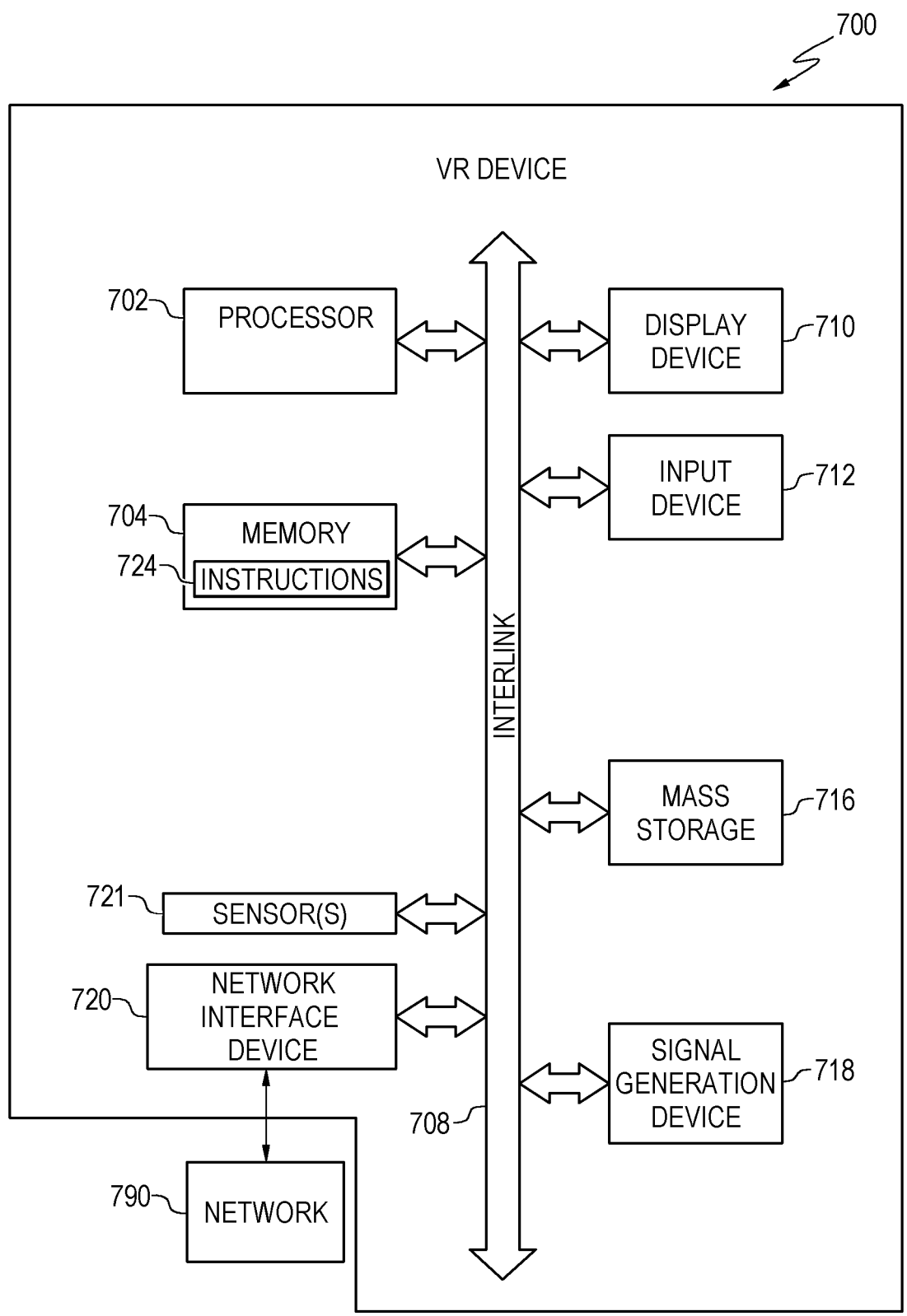
FIG. 7 is a block diagram of a virtual reality device, in accordance with various embodiments.

FIG. 1 illustrates a diagram of a navigable space 100, in accordance with various embodiments. The navigable space 100 in the example shown comprises an indoor space, but the concepts discussed herein are equally applicable to outdoor spaces. The diagram of the navigable space is for purposes of illustration only as other spaces may be used by the method for collective navigation for VR users. The navigable space 100 includes a VR controller 150 (see FIG. 2) for generating and operating a VR system, and one or more VR devices 700 worn and/or used by one or more users 105. A VR device 700 according to one embodiment is shown in FIG. 7 and discussed below.

The VR system and VR controller 150 provide VR content to the one or more users 105 via the one or more VR devices 700. In the embodiments disclosed herein, the VR system and VR controller 150 additionally provide navigation instructions to the one or more users 105 via the one or more VR devices 700.

The navigation instructions provided to the one or more users 105 comprise an optimal route for each individual user of the one or more users 105. The navigation instructions comprise a collective navigation for the one or more users 105. The navigation instructions provided to the one or more users 105 may enable an individual user to navigate the navigable space 100 while avoiding large groups in any one area of the navigable space 100. The navigation instructions may enable an individual user to more easily and efficiently move about within the navigable space 100. The navigation instructions may coordinate movements, movement directions, and movement timings of the one or more users 105.

The illustrated navigable space 100 represents a typical museum, for example, with exhibits to be viewed by the VR users. The VR system may provide additional information to the users as they traverse the rooms and halls of the museum. Other navigable spaces may include other indoor spaces as well as outdoor spaces that would benefit from the VR technology.

Figure 3:
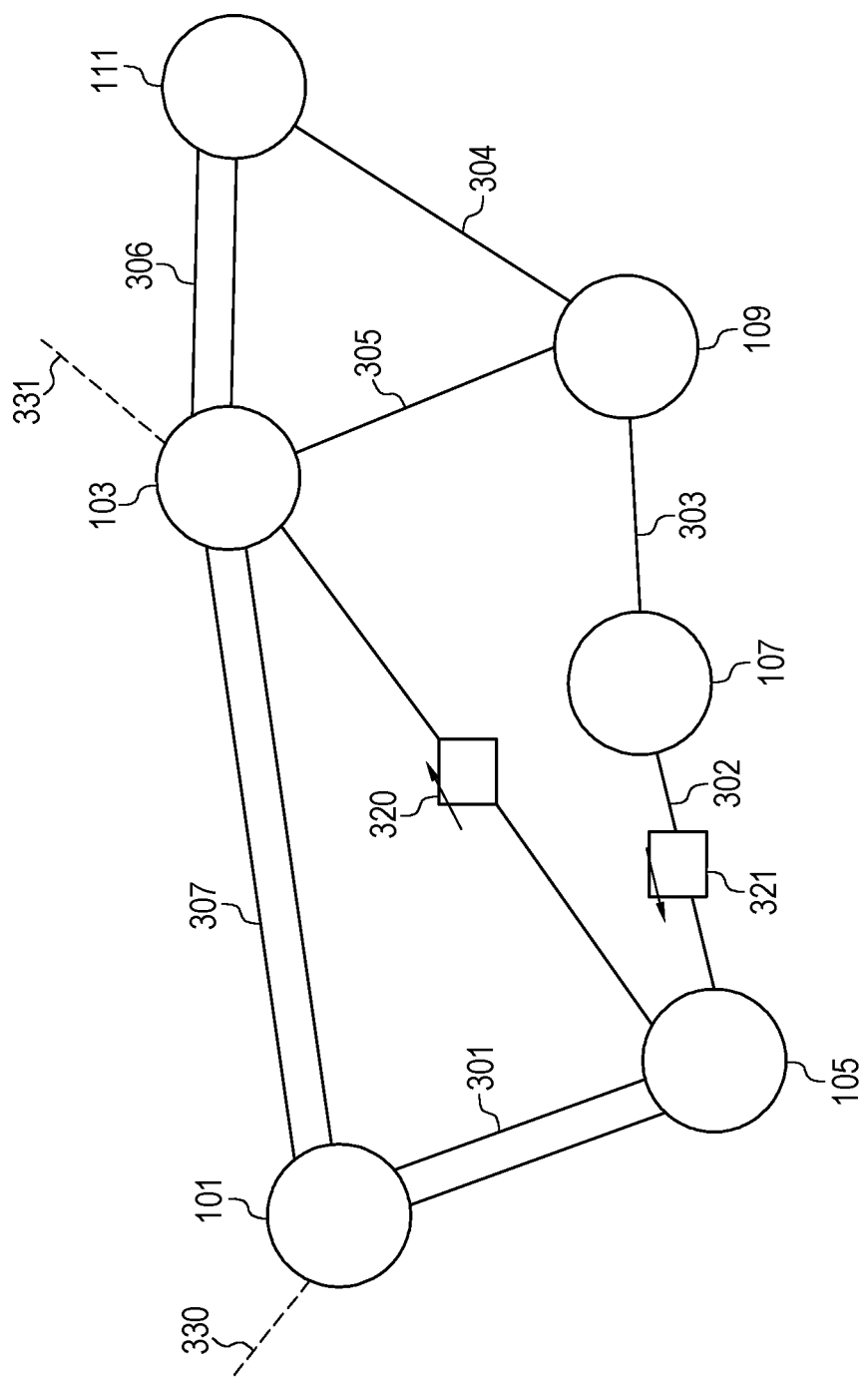
FIG. 3 is a graph model of the navigable indoor space of FIG. 1, in accordance with various embodiments.

The navigable space 100 is initially modeled to generate a graph model that represents the space. One embodiment of such a graph model is illustrated in FIG. 3 and described subsequently.

In modeling the navigable space 100, each structural point in the navigable space 100 is designated as a vertex (i.e.

point where lines meet) for the subsequently described graph model. The structural point may be a physical structure or a virtual structure, for example. The vertices may represent doors, museum exhibits, windows, furniture, or any other structure, real or virtual, the user may have a desire to navigate to or around.

For example, a door 101 leading into a first room 120 is designated as a first vertex. Another door 103 leading from the first room to a second room 121 is a second vertex. An exhibit 105 in the second room 121 is a third vertex. A door 107 between the second room 121 and a third room 123 is a fourth vertex. An exhibit 109 in the fourth room 123 is a fifth vertex. Another door 111 connects the fourth room 123 to a navigable hallway 124 that connects to the first door 101.

Vertices can be connected by edges in the graph model. Edges represent possible paths between vertices that may be traversed by persons/users moving through the navigable space 100. Where a path between a first vertex and a second vertex does not exist, there will not be an edge. A navigable path comprises a sequence of consecutive vertices and edges, where edges are path segments.

Each edge is weighted by the distance between two corresponding vertices. The longer the edge distance, the larger the weight. The path weight for a navigable path is a total of all of the weights for the edges that make up the navigable path. The shortest path between source and destination vertices is defined as the path with the minimum path weight.

Figure 2:
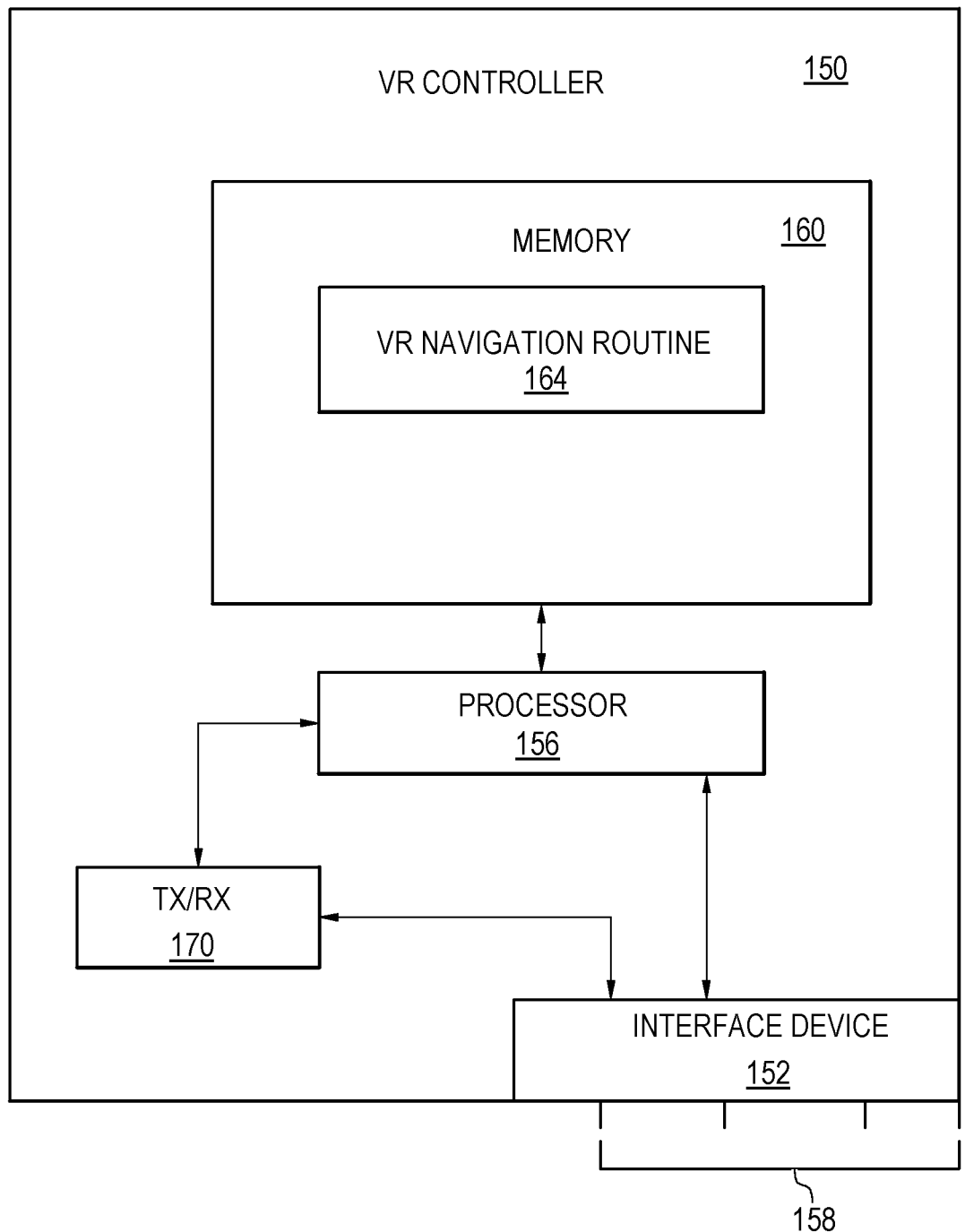
FIG. 2 is a schematic of a VR controller according to an embodiment.

FIG. 2 is a schematic of the VR controller 150 according to an embodiment. The VR controller 150 in some embodiments comprises (or is in communication with) a content server providing VR content. The VR controller 150 includes an interface 152, a transceiver (Tx/Rx) 170, a memory 160, and a processor 156. The processor 156 is coupled to the interface 152, the Tx/Rx 170, and the memory 160.

The VR controller 150 may execute any methods disclosed herein and transmit navigation instructions to the VR devices 700 (e.g., see FIG. 7) in the navigable space 100. The memory 160 may include instructions for generating VR content that may be transmitted to the VR devices 700 over a relatively low power wireless channel that covers the navigable space 100 in some embodiments. If the methods disclosed herein are executed by each VR device 700, the VR controller 150 may transmit locations and movement of each VR device 700 in the navigable space 100 to all of the VR devices 700 within the navigable space 100.

The interface 152 comprises an interface to external users, devices, and/or networks. The VR controller 150 receives inputs and/or messages via the interface 152. The VR controller 150 generates outputs and/or outgoing messages via the interface 152 or relays outputs and/or outgoing messages from the Tx/Rx 170 or the processor 156.

The interface 152 includes one or more ports 158. External devices and/or networks can be connected to the one or more ports 158, including VR headsets or other VR user devices or systems.

The Tx/Rx 170 comprises a component or circuitry capable of sending and receiving messages, data, or other communications. The Tx/Rx 170 interacts with one or more external users, devices, and/or networks. The Tx/Rx 170 can communicate via wired or wireless communications and wired or wireless communication protocols. The Tx/Rx 170 interacts with the processor 156 and/or the interface 152 to exchange communications with one or more external users, devices, and/or networks.

The memory 160 comprises a non-transitory storage medium. The memory 160 comprises any manner of volatile or non-volatile electronic storage. The memory 160 stores, among other things, a VR navigation routine 164. The VR navigation routine 164 comprises computer instructions and other data that operates the VR controller 150 when accessed and executed by the processor 156.

The processor 156 comprises any manner of suitable processor, microprocessor, or other configurable circuit or circuits that controls operations of the VR controller 150. The processor 156 can execute the VR navigation routine 164 to control and operate the VR controller 150. The processor 156 can execute the VR navigation routine 164 to generate a VR experience for one or more persons. The processor 156 can execute the VR navigation routine 164 to navigate one or more persons through a navigable space 100, as described below.

In some embodiments, the processor 156 executes the VR navigation routine 164 to obtain a source vertex and a destination vertex for a VR device, with the source vertex and the destination vertex comprising vertices of a graph model of a navigable space, the graph model comprising a plurality of vertices and a plurality of edges, with a vertex representing a point within the navigable space and with an edge representing a path segment between two corresponding vertices, determine a subset of possible vertices for a navigable path, with the subset of possible vertices being selected from the plurality of vertices, compute a vertex traffic potential for each vertex of the subset of possible vertices, and determine the navigable path from the source vertex to the destination vertex comprising one or more consecutive path segments selected to minimize segment path lengths and selected to minimize vertex traffic potentials.

FIG. 3 illustrates a graph model of the navigable space 100 of FIG. 1, in accordance with various embodiments. The graph model represents at least a portion of the navigable space. This representation may be represented by the function G(V, E, Θ) where V and E represent all of the vertices and edges, respectively, of the graph model and Θ represents all of the other parameters discussed subsequently.

This representation shows vertices 101, 103, 105, 107, 109, and 111 of FIG. 1 represented as circles. Individual navigable path segments 301-307 between the vertices 101, 103, 105, 107, 109, and 111 are represented as lines. The individual navigable path segments 301-307 (e.g., hallways, rooms, et cetera) are designated as edges and connect two directly reachable vertices 101, 103, 105, 107, 109, 111.

The width of the edges vary depending on a capacity of a number of users that can use the navigable path simultaneously. For example, the edge 307 is represented by two spaced-apart lines, indicating a large capacity of users relative to a single thin line 304, representing a relatively small capacity. The edge capacity may be used as a parameter in the collective navigation of multiple users.

VR users 320, 321 are shown transitioning from one vertex to another. The direction of travel for the users 320, 321 is also shown. For example, a first user 320 is shown traveling from vertex 105 to vertex 103. A second user 321 is shown traveling from vertex 107 to vertex 105. Each user has a direction and consumes edge capacity. In some embodiments, each user can be made aware of other users in the area.

Some of the vertices 101, 103 may also connect to other vertices not shown and modeled. These edges 330, 331 are shown as dashed lines extending from their respective vertices 101, 103.

The method for collective navigation for VR users guides a VR user from a source vertex to a destination vertex while minimizing the number of users at each vertex and along each edge. Thus, user traffic flow can be improved, while assisting VR users in moving from a source to a destination.

Each vertex comprises a vertex traffic potential. In some embodiments, a particular vertex traffic potential for a particular vertex is computed for all vertices connected to the particular vertex by a single edge. In one embodiment, the vertex traffic potential for a particular vertex comprises the number of VR devices/users at the particular vertex. In another embodiment, the vertex traffic potential for the particular vertex comprises a number of VR users (i.e. VR devices) that are currently located at the particular vertex plus the number of VR users (i.e., VR devices) that are approaching the particular vertex.

Each vertex traffic potential may be dynamically adjusted. Each vertex traffic potential provides local guidance of VR users from the perspective of traffic flow. An embodiment of the method for collective navigation of VR devices dynamically adjusts the potential of each vertex in order to provide an in-flow of users to a particular vertex that is approximately equal to an out-flow of users from that particular vertex (or is substantially equal over a predetermined time period).

Figure 4:
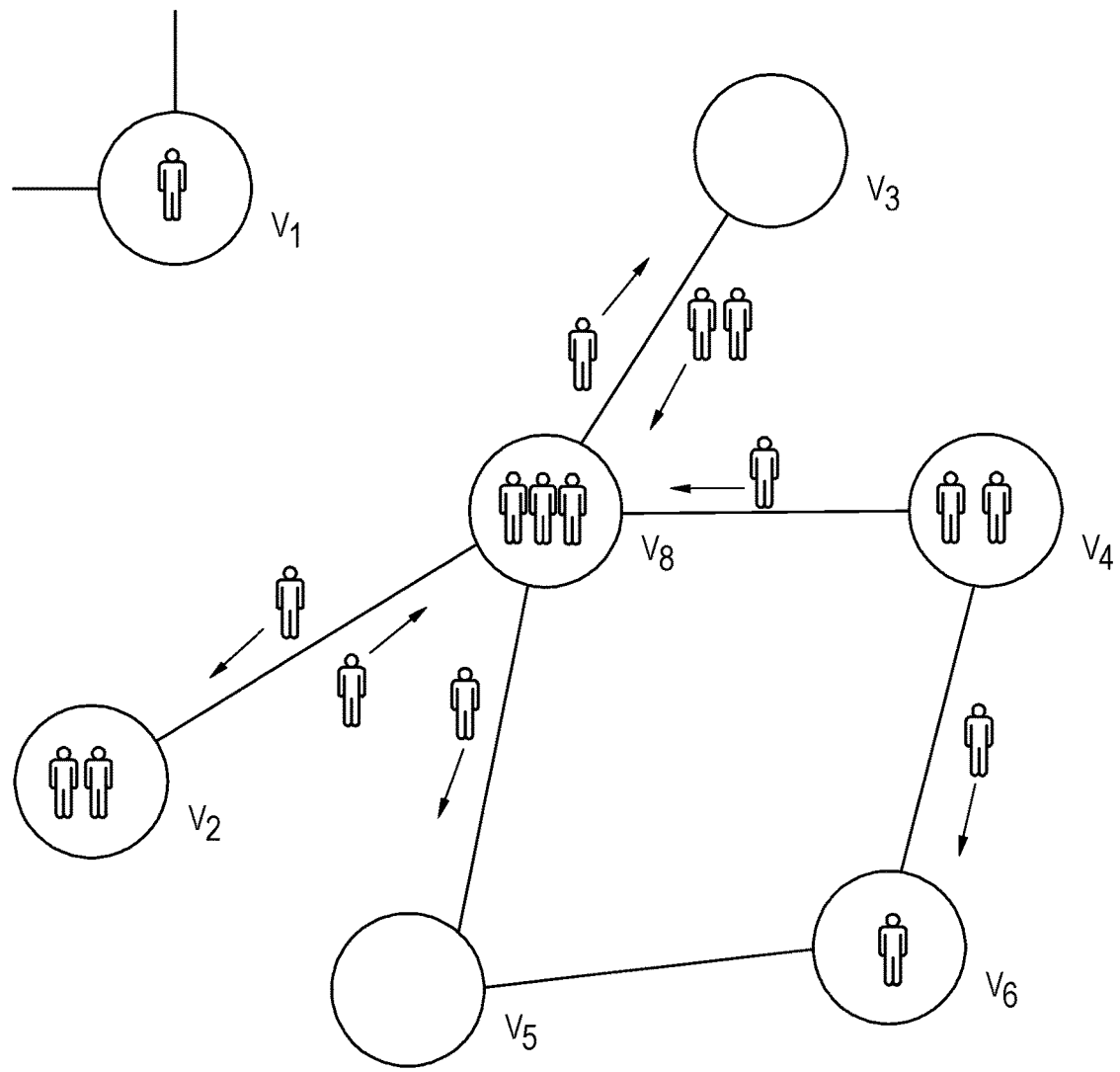
FIG. 4 is a computation of a vertex traffic potential for a particular vertex $v_8$.

FIG. 4 illustrates a computation of a vertex traffic potential for a particular vertex $v_8$. In this example, a path segment between vertex $v_2$ and vertex $v_8$ is being evaluated for inclusion in a user path. Consequently, vertex traffic potentials for vertexes connected to vertex $v_8$ by a single edge will be computed. Therefore, in this example, vertex traffic potentials will be computed for vertices $v_3$, $v_4$, and $v_5$. The potential user path in his example could be from $v_2$ to $v_8$, then to a destination vertex through one of $v_3$, $v_4$, or $v_5$ as a next vertex. A vertex traffic potential for $v_8$ in one embodiment comprises the number of persons/users currently at vertex $v_8$, which is three in this example. A vertex traffic potential for $v_8$ in one embodiment comprises the number of persons/users currently at vertex $v_8$ (as discussed above), plus the number of persons/users moving toward vertex $v_8$. The number of persons/users moving toward vertex $v_8$ in this example is four, comprising one person/user moving toward vertex $v_8$ from vertex $v_2$, two persons/users moving toward vertex $v_8$ from vertex $v_3$, and one person/user moving toward vertex $v_8$ from vertex $v_4$. The total vertex traffic potential for vertex $v_2$ in this second embodiment is therefore seven.

Figure 5:
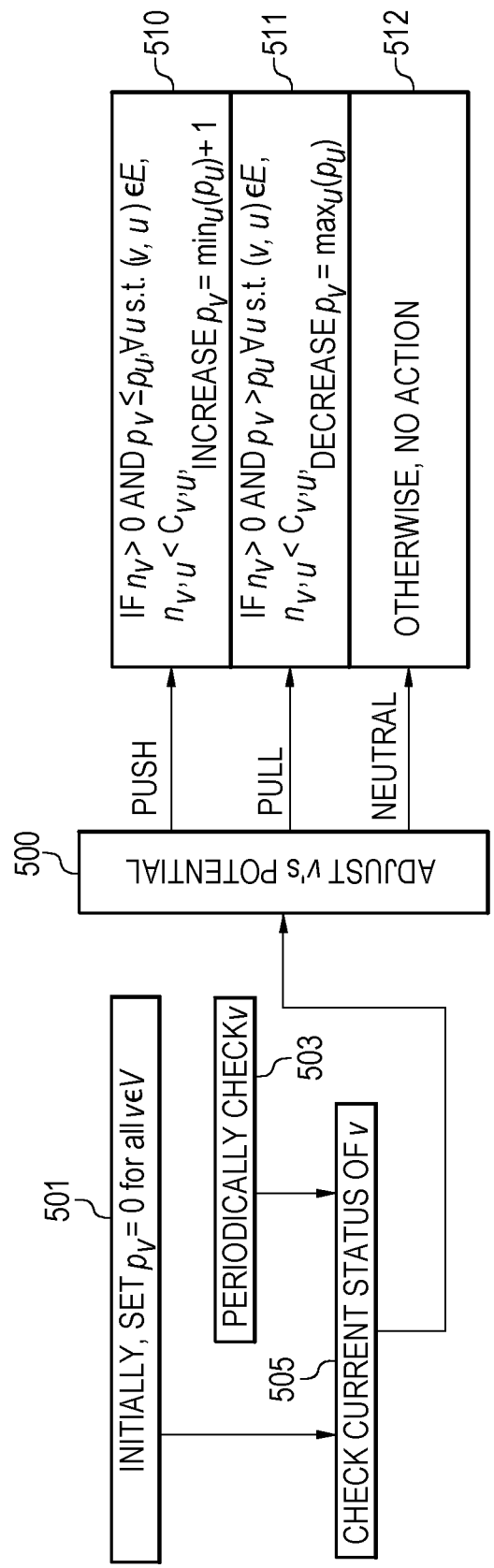
FIG. 5 is a flow diagram for adjusting vertex traffic potentials, in accordance with various embodiments.

FIG. 5 is a flow diagram for adjusting vertex potentials, in accordance with various embodiments. In the flow diagram, one vertex of the graph model is represented by u and a second vertex is represented by v. An edge between these two vertices u and v is represented by (v,u). Additionally, $n_u$ represents a number of users currently at vertex u, where $p_u$ represents a potential number of users that can simultaneously be at vertex u, where $p_v$ represents a potential number of users that can simultaneously be at vertex v, where $n_{u,v}$ represents the number of users currently moving from vertex u to vertex v, and where $c_{u,v}$ represents a capacity of an edge between vertex u and vertex v.

The flow diagram adjusts each vertex potential p by providing local guidance from the perspective of traffic flow. The users are driven from a vertex having a higher potential to a vertex having a lower potential, thus attempting to reach $n_v$=0 so that in-flow of traffic to a vertex is equal to out-flow of traffic from the vertex.

In block 501, initially the vertex potentials are set equal for all vertices V that are part of the graph model (i.e. $p_v$=0 for all v∈V). The number of users at vertex v and the number of users nearby are periodically checked in block 503. In block 505, the current status of vertex v is checked. Based on the initialization and the periodic check (i.e. block 503), the current status of vertexv(e.g., how crowded is the vertex now and how many VR users are approaching that vertex) is determined so that an adjustment may be performed in block 500, as necessary, to balance the in-flow and out-flow from vertex v. If the potential status of that vertex is high (e.g., the vertex is going to be crowded), then the following process tends to push some users to neighboring vertices (e.g., see block 510). If the potential status of that vertex is low (e.g., the vertex is not crowded), then the following process tends to pull some users from neighboring vertices (e.g., see block 511). Otherwise, the process is neutral and the process neither pushes nor pulls users (e.g., see block 512).

In block 510, it is determined if: the number of users at vertex v is greater than 0 (i.e. $n_v$>0), the potential number of users at vertex v is less than or equal to the potential number of users at vertex u, for all u such that edge (v,u) is an element of all the edges (i.e. $p_v \leq p_u$, =u s.t. (v,u)∈E), and if the number of users moving on the edge from vertex v to vertex u is less than the capacity of that edge (i.e. $n_{v,u} < c_{v,u}$). If all of these conditions are met, then users are pushed to a neighboring vertex (i.e., increase $p_v = \min_u(p_u)+1$).

In block 511, it is determined if: the number of users at vertex v is greater than 0 (i.e. $n_v$>0), the potential number of users at vertex v is greater than the potential number of users at vertex u, for all u such that edge (v,u) is an element of all the edges (i.e. $p_v > p_u$, ∀u s.t. (v,u)∈E), and if the number of users moving on the edge from vertex u to vertex v is less than the capacity of that edge (i.e. $n_{u,v} < c_{u,v}$). If all of these conditions are met, then users are pulled from a neighboring vertex (i.e., decrease $p_v = \max_u(p_u)$).

In block 512, if neither of the conditions discussed in blocks 510 or 511 are true, then no action is taken. In other words, the potential of the vertices is not adjusted.

Figure 6:
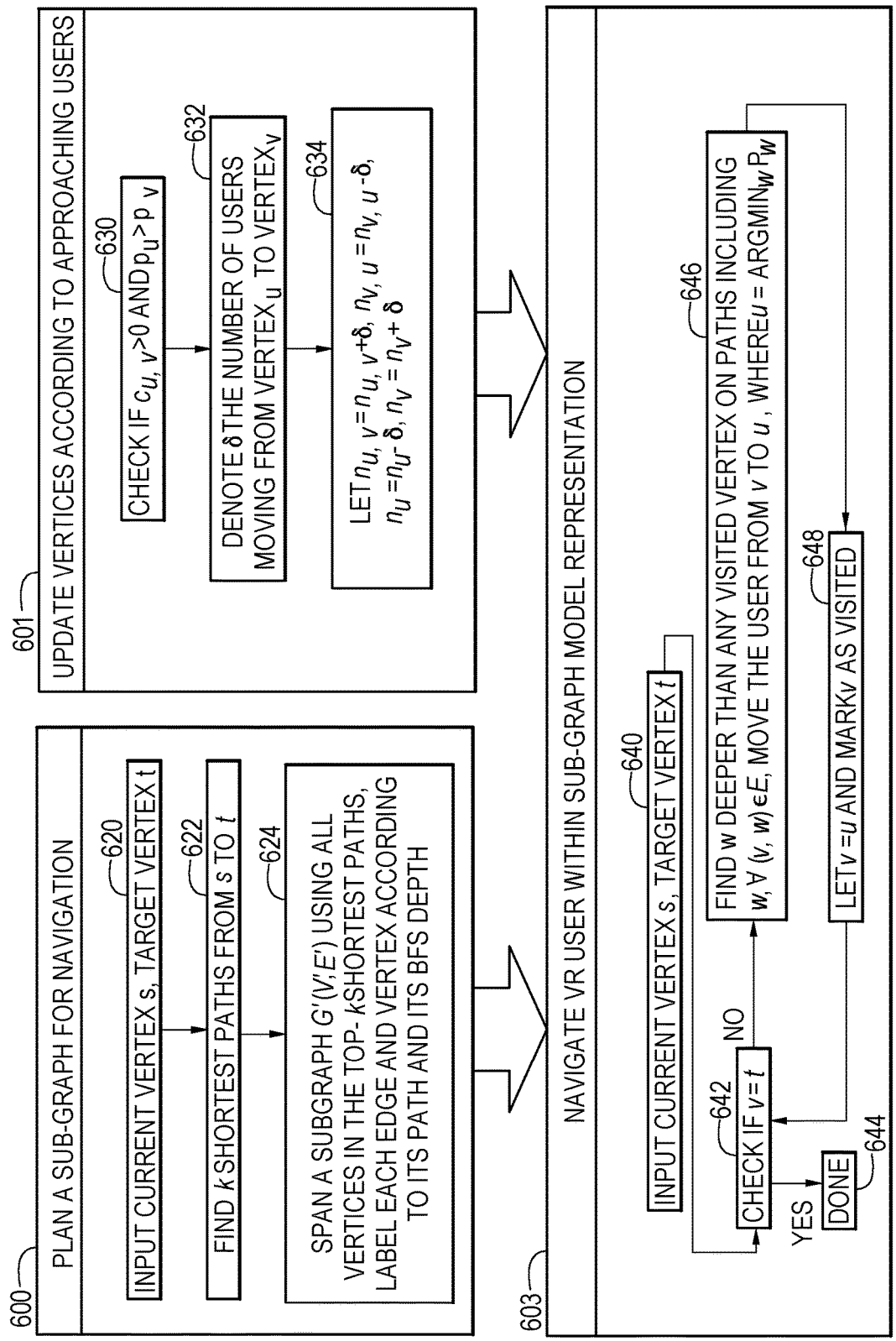
FIG. 6 is a flow diagram of a method for collective navigation for VR devices, in accordance with various embodiments.

FIG. 6 is a flow diagram of a method for collective navigation for VR devices, in accordance with various embodiments. This method may be broken down into three parts: planning a sub-graph model for navigation in block 600, updating vertices potential according to incoming users in block 601, as discussed in FIG. 5, and instructing a VR user to navigate through the graph model according to the graph structure and current parameters in block 603.

In block 600, a sub-graph model (sub-graph) for navigation G'(V', E') is generated based on a shortest path between the source vertex s and destination (e.g., target, where the VR user wishes to go) vertex t. The sub-graph is a subset of vertices and connecting edges. The sub-graph model increases the probability that the VR user may actually remain with that particular number of vertices and edges of the sub-graph. The initial sub-graph does not take into account any other users besides the VR user who is navigating from vertex s to vertex t.

Initially, in block 620, the user is asked for or the method automatically determines (e.g., from user preferences) the current user vertex s and the target vertex t. The user's current vertex may be determined by the system asking the user for a current location (e.g., by a certain exhibit, in a doorway) or using some form of navigation (e.g., WiFi™ access point triangulation) to determine the user's starting point (or current location).

In block 622, a plurality of shortest paths (i.e. k paths) are determined from vertex s to vertex t through the graph model. The number of shortest paths k may be determined by, for example, sorting the paths from vertex s to vertex t according to the path weights in ascending order. The k paths of these sorted paths are considered to be the plurality of shortest paths. If k turns out to be less than a predetermined threshold (e.g., k<5), then the threshold may be used as k (i.e. k=5).

In block 624, all of the vertices in the k shortest paths are assigned to the sub-graph G'(V', E'), and therefore span the subgraph G'(V', E'). Each vertex and edge in the sub-graph is then labeled according to its vertex path and breadth first search (BFS) depth. BFS depth may be determined by starting from a vertex of a graph and labeling its depth as 0. Then, all the neighbors of the vertex are visited. The depth of the first level of neighbors is labeled as 1. Then these neighbors' unvisited neighbors are visited and the depth of the neighbors' neighbors is labeled as 2. This continues for all of the vertices of the graph to determine the depth of the vertex path.

In block 601, the potentials of the vertices are updated according to the number of approaching VR users. One example of this process is illustrated in FIG. 5. Block 601 therefore determines a number of potential approaching VR users in some examples.

In block 630, it is determined if the capacity of the edge is greater than 0 (i.e. $c_{u,v}>0$) and the potential of vertex u is greater than the potential of vertex v (i.e. $p_u>p_v$). In block 632, the variable δ is assigned to represent the number of VR users that are moving from vertex u to vertex v. Outputs of both block 630 and 632 are input to block 634.

In block 634, the number of potential VR users moving away from vertex u and towards vertex v is defined as $n_{u,v}=n_{u,v}+\delta$. Thus, the number of VR users moving towards vertex u and away from vertex v is defined as $n_{v,u}=n_{v,u}-\delta$. The number of users at vertex u may be defined as $n_u=n_u-\delta$. The number of users at vertex v may be defined as $n_v=n_v+\delta$.

In block 603, the output of the generated sub-graph model of block 600 and the number of VR users approaching the vertex of block 601 are inputted to block 603. This block determines a navigation path for the VR user from the source vertex to the destination vertex, based on the generated sub-graph and the number of approaching VR users to the vertices in the sub-graph.

In block 640, the VR user starts at vertex s in sub-graph G'. Vertex s is relabeled as vertex v and vertex v is marked as already visited.

In block 642, the present vertex is checked to determine if it is equal to the target vertex t. In other words, the method checks to see if the VR user has reached the desired destination. If vertex v=vertex t, the VR user has reached their desired destination and the method is complete in block 644. If vertex v≠vertex t, then the method branches to block 646.

If the vertex v≠vertex t, in block 646 the VR user is provided navigation instructions (e.g., visually on the VR device, and/or aurally from a speaker, for example) to move from vertex v to an unvisited vertex u within the sub-graph G', where vertex u is part of a set of neighboring vertices w that are elements of all vertices of the graph model (i.e. w, ∀ (v,w) ∈E). The VR user is instructed to navigate from vertex v to vertex u of the set of vertices w that have a relatively lower potential for the neighboring vertices (i.e. $u=\arg\min_w p_w$). The method for collective navigation for VR devices therefore provides individual navigation for each VR user, taking into account other VR users in the navigable space. The VR users may use the provided navigation information to navigate the space while avoiding large groups in any one area of the navigable space, improving traffic flow and enhancing the user's experience.

In block 648, the VR user's present vertex is set to u and the previous vertex v is marked as visited. The method then checks again, in block 642, whether vertex u is the destination vertex t. Blocks 646 and 648 repeat until the target vertex t is reached.

In practical use, since each vertex represents a structure point of the navigable space, either virtual or physical, the VR user may be instructed which vertex to go to next by their VR display showing an image of the next structure item to visit or a path being displayed on the display. Other embodiments, may instruct the VR user to approach other vertices in different ways (e.g., computer generated voice over speaker, a map provided on display, et cetera).

It should be understood that computation of a vertex traffic potential for a particular vertex will take into account all edges connected to the particular vertex. Further, each vertex in a subset of possible vertices can be iteratively processed to compute a set of vertex traffic potentials.

FIG. 7 is a block diagram of a VR device 700, in accordance with various embodiments. The block diagram of FIG. 7 is for purposes of illustration only, as different VR devices may include different functions and, thus, be represented by other block diagrams.

The VR device 700 includes a processor 702 (e.g., a central processing unit (CPU), a graphics processing unit (GPU), a hardware processor core, or any combination thereof), and memory 704. The processor 702 and memory 704 together may be referred to as a controller. The various elements of the device 700 communicate with each other over an interlink (i.e. bus) 708.

The VR device 700 further includes a display unit 710 that displays the VR content to the user. An input device 712 (e.g., keypad, touchscreen display) is coupled to the bus 708 and used to enable the user to communicate with the VR device and rest of the VR system over a network 790.

The VR device 700 may additionally include a mass storage device 716 (e.g., flash memory, random access memory (RAM), read only memory (ROM)) 716, a signal generation device 718 (e.g., a speaker), a network interface device 720, and one or more sensors 721. The speaker 718 may be part of a headset worn by the user to provide computer generated voice navigational feedback to the user regarding the results of any methods disclosed herein.

The sensors 721 may include, but are not limit to: accelerometers, compasses, gyroscopes, thermometers, WiFi™ access point localization, image sensors, and/or GPS sensors located in one or more locations of the VR device 700. The sensors 721 may be used to determine a present position and movement of the VR device 700. The VR controller 150 of the VR system (see FIG. 1) may determine present position and movement of each VR device 700 in the navigable area by reading sensor data from each VR device 700.

The memory 704 comprises at least one non-transitory computer-readable medium on which is stored one or more sets of data structures or instructions 724 (e.g., software) embodying or utilized by any one or more of the techniques, methods, or functions described herein. The instructions 724 may also reside, at least partially, in additional computer-readable memories, such as within the processor 702 during execution thereof by the VR device 700. In an example, one or any combination of the processor 702, the memory 704 or the mass storage device 716 may constitute non-transitory computer-readable media.

The network interface device 720 is configured to communicate with one or more networks 790. The network interface device 720 may include any wired or wireless interface, such as a radio, for communicating over a channel. For example, the VR device may receive VR content from a content provider over the channel. The radio may operate using a Bluetooth® protocol communication link, an IEEE 802.11 standard link, or any other communication protocol or communication standard for reading data from sensors over a wireless channel. The network 790 may be a peer-to-peer network, a local area network (LAN), or a wide area network (WAN) including the Internet.

The VR device 700 may be part of a VR system that includes the device being coupled over the network 790 to a content server (not shown). The VR system may include a plurality of VR users walking through a navigable space. Each VR user may have a respective VR user trajectory as determined by and controlled by the respective VR device 700, and with input from the VR system via the VR controller 150.

The methods disclosed herein may be executed by each VR device 700 of the VR system or by the VR controller 150. The resulting navigation instructions are transmitted to the respective VR users through the VR devices 700 (e.g., through VR content or in signals, messages, et cetera). Other embodiments may execute portions of the methods with the VR controller 150 and other portions with each respective VR device 700.

In some embodiments, the processor 702 executes the instructions 724 to obtain a source vertex and a destination vertex for a VR device, with the source vertex and the destination vertex comprising vertices of a graph model of a navigable space, the graph model comprising a plurality of vertices and a plurality of edges, with a vertex representing a point within the navigable space and with an edge representing an path segment between two corresponding vertices, determine a subset of possible vertices for a user path, with the subset of possible vertices being selected from the plurality of vertices, compute a vertex traffic potential for each vertex of the subset of possible vertices, and determine the user path from the source vertex to the destination vertex comprising one or more consecutive path segments selected to minimize segment path lengths and selected to minimize vertex traffic potentials.

In summary, the method for collective navigation for VR devices generates a graph model of a navigable space. In an embodiment, the model may be a subset (i.e. sub-graph model) of the navigable space. The graph model includes a plurality of vertices including the source vertex and the destination vertex, each vertex representing a respective structural point of the navigable space and coupled to an adjacent vertex by an edge. The graph model comprises a plurality of vertices and a plurality of edges, with a vertex representing a point within the navigable space and with an edge representing a path segment between two corresponding vertices. The method determines the potential of each respective vertex by determining a number of VR devices located at each respective vertex and a number of VR devices approaching each respective vertex. Navigation instructions are provided to a VR user to navigate from the source vertex to the destination vertex based on a plurality of shortest paths between the source vertex and the destination vertex and the number of VR devices approaching each vertex in the plurality of shortest paths.

In determining the plurality of shortest paths between the source vertex and the destination vertex, the method may determine the paths having fewer vertices or edges as compared to other paths between the source vertex and the destination vertex. The sub-graph model may then be generated based on the plurality of shortest paths.

Disclosed implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Examples, as described herein, may include or operate on logic elements or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 702 may be configured by firmware or software (e.g., instructions, an application portion, or an application) as a module that operates to perform specified operations. In an example, the software may reside on a non-transitory computer readable medium. In an example, the software, when executed by the underlying hardware of the module, causes the VR device to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose processor 702 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a computer. For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

EXAMPLES

Various examples are now described to introduce a selection of concepts in a simplified form that are further described below in the detailed description. The Summary is not intended to identify key or essential features of the claimed subject matter, nor is it intended to be used to limit the scope of the claimed subject matter.

Example 1 is a computer-executed method for collective navigation for distributed virtual reality (VR) devices, the method comprising: obtaining a source vertex and a destination vertex for a VR device, with the source vertex and the destination vertex comprising vertices of a graph model of a navigable space, the graph model comprising a plurality of vertices and a plurality of edges, with a vertex representing a point within the navigable space and with an edge representing a path segment between two corresponding vertices; determining a subset of possible vertices for a navigable path, with the subset of possible vertices being selected from the plurality of vertices; computing a vertex traffic potential for each vertex of the subset of possible vertices; and determining the navigable path from the source vertex to the destination vertex comprising selecting one or more consecutive path segments to minimize segment path lengths and to minimize vertex traffic potentials.

In Example 2, the subject matter of Example 1 optionally includes providing navigation instructions to the VR device, with the navigation instructions based on the navigable path.

In Example 3, the subject matter of Example 2 optionally includes wherein the navigation instructions are combined with VR content for the VR device.

In Example 4, the subject matter of any one or more of Examples 1-3 optionally include wherein a vertex traffic potential is computed for all vertices connected to a particular vertex by a single edge.

In Example 5, the subject matter of any one or more of Examples 1-4 optionally include with a particular vertex traffic potential for a particular vertex comprising a number of VR devices present at the particular vertex.

In Example 6, the subject matter of any one or more of Examples 1-5 optionally include with a particular vertex traffic potential for a particular vertex comprising a number of VR devices present at the particular vertex combined with a number of VR devices approaching the particular vertex.

In Example 7, the subject matter of any one or more of Examples 1-6 optionally include wherein an edge includes one or both of a path segment length or a path segment capacity.

In Example 8, the subject matter of any one or more of Examples 1-7 optionally include with determining the navigable path further comprising selecting the one or more consecutive path segments to minimize the segment path lengths, to minimize the vertex traffic potentials, and according to path segment capacities.

In Example 9, the subject matter of any one or more of Examples 1-8 optionally include wherein the navigable path navigates the VR device from a first vertex having a high vertex traffic potential to a second vertex having a low vertex traffic potential.

In Example 10, the subject matter of any one or more of Examples 1-9 optionally include with the determining the navigable path further comprising determining the plurality of shortest paths between the source vertex and the destination vertex, wherein the plurality of shortest paths comprise paths having one or both of fewer vertices or fewer edges as compared to other possible paths between the source vertex and the destination vertex.

In Example 11, the subject matter of any one or more of Examples 1-10 optionally include sorting the plurality of possible navigable paths to determine the subset of possible navigable paths, the plurality of possible navigable paths sorted according to a respective path weight for each navigable path, wherein the respective path weight represents an edge distance between corresponding vertices.

In Example 12, the subject matter of Example 11 optionally includes sorting the plurality of possible navigable paths from lowest path weight to highest path weight to find k shortest navigable paths.

In Example 13, the subject matter of any one or more of Examples 1-12 optionally include with the navigable path instructing the VR device to move from a second vertex to a first vertex when a first vertex potential is less than a second vertex potential, or instructing the VR device to move from the first vertex to the second vertex when the second vertex potential is less than the first vertex potential.

Example 14 is a virtual reality (VR) device, comprising: a non-transitory memory storage comprising instructions; and one or more processors in communication with the memory, wherein the one or more processors execute the instructions to: obtain a source vertex and a destination vertex for the VR device, with the source vertex and the destination vertex comprising vertices of a graph model of a navigable space, the graph model comprising a plurality of vertices and a plurality of edges, with a vertex representing a point within the navigable space and with an edge representing a path segment between two corresponding vertices, wherein the source vertex and the destination vertex are coupled by a plurality of possible navigable paths each comprising a respective edge between two corresponding vertices; determine a subset of possible navigable paths, with the subset of possible navigable paths being selected from the plurality of possible navigable paths; compute a vertex traffic potential for each vertex of the subset of possible vertices; and determine the navigable path from the source vertex to the destination vertex comprising selecting one or more consecutive path segments to minimize segment path lengths and to minimize vertex traffic potentials.

In Example 15, the subject matter of Example 14 optionally includes wherein the one or more processors execute the instructions to provide navigation instructions to the VR device, with the navigation instructions based on the navigable path.

In Example 16, the subject matter of Example 15 optionally includes wherein the navigation instructions are combined with VR content for the VR device.

In Example 17, the subject matter of any one or more of Examples 14-16 optionally include wherein the one or more processors execute the instructions to compute a vertex traffic potential for all vertices connected to a particular vertex by a single edge.

In Example 18, the subject matter of any one or more of Examples 14-17 optionally include with a particular vertex traffic potential for a particular vertex comprising a number of VR devices present at the particular vertex.

In Example 19, the subject matter of any one or more of Examples 14-18 optionally include with a particular vertex traffic potential for a particular vertex comprising a number of VR devices present at the particular vertex combined with a number of VR devices approaching the particular vertex.

In Example 20, the subject matter of any one or more of Examples 14-19 optionally include wherein an edge includes one or both of a path segment length or a path segment capacity.

In Example 21, the subject matter of any one or more of Examples 14-20 optionally include with determining the navigable path further comprising selecting the one or more consecutive path segments to minimize the segment path lengths, to minimize the vertex traffic potentials, and according to path segment capacities.

In Example 22, the subject matter of any one or more of Examples 14-21 optionally include wherein the navigable path navigates the VR device from a first vertex having a high vertex traffic potential to a second vertex having a low vertex traffic potential.

In Example 23, the subject matter of any one or more of Examples 14-22 optionally include wherein the one or more processors execute the instructions to determine the plurality of shortest paths between the source vertex and the destination vertex, wherein the plurality of shortest paths comprise paths having one or both of fewer vertices or fewer edges as compared to other possible paths between the source vertex and the destination vertex.

In Example 24, the subject matter of any one or more of Examples 14-23 optionally include wherein the one or more processors execute the instructions to sort the plurality of possible navigable paths to determine the subset of possible navigable paths, the plurality of possible navigable paths sorted according to a respective path weight for each navigable path, wherein the respective path weight represents an edge distance between corresponding vertices.

In Example 25, the subject matter of Example 24 optionally includes wherein the one or more processors execute the instructions to sort the plurality of possible navigable paths from lowest path weight to highest path weight to find k shortest navigable paths.

In Example 26, the subject matter of any one or more of Examples 14-25 optionally include with the navigable path instructing the VR device to move from a second vertex to a first vertex when a first vertex potential is less than a second vertex potential, or instructing the VR device to move from the first vertex to the second vertex when the second vertex potential is less than the first vertex potential.

Example 27 is a non-transitory computer-readable media storing computer instructions for collective navigation for distributed virtual reality (VR) devices, that when executed by one or more processors, cause the one or more processors to perform the steps of: obtain a source vertex and a destination vertex for a VR device, with the source vertex and the destination vertex comprising vertices of a graph model of a navigable space, the graph model comprising a plurality of vertices and a plurality of edges, with a vertex representing a point within the navigable space and with an edge representing a path segment between two corresponding vertices; determine a subset of possible vertices for a navigable path, with the subset of possible vertices being selected from the plurality of vertices; compute a vertex traffic potential for each vertex of the subset of possible vertices; and determine the navigable path from the source vertex to the destination vertex comprising one or more consecutive path segments selected to minimize segment path lengths and selected to minimize vertex traffic potentials.

The previous description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The Abstract is provided with the understanding that it will not be used to limit or interpret the scope or meaning of the claims. The following claims are hereby incorporated into the detailed description, with each claim standing on its own as a separate embodiment.

What is claimed is:

1. A computer-executed method for collective navigation for distributed virtual reality (VR) devices, the method comprising:
    obtaining a graph model comprising a plurality of vertices of a navigable space including a source vertex and a destination vertex for a VR device, the graph model comprising a plurality of edges, wherein each vertex represents a respective point within the navigable space, wherein each edge represents a respective path segment between two corresponding vertices, and wherein at least a portion of the plurality of edges represent multiple path segments coupled to a single vertex and associated with different navigable paths between the source and destination vertices;
    determining a plurality of weights assigned to the plurality of edges, each of the plurality of weights indicative of a distance between corresponding vertices of an edge;
    determining a subset of the plurality of vertices of the graph model for a navigable path of a plurality of navigable paths associated with the plurality of edges, the determining based on the plurality of weights;
    computing a vertex traffic potential for each vertex of the subset of the plurality of vertices comprising a respective number of VR devices present at a respective location corresponding to the vertex, wherein the computing further includes dynamically adjusting the vertex traffic potential for a particular vertex of the subset of the plurality of vertices based on in-flow and out-flow of the VR devices from the particular vertex; and
    determining the navigable path from the source vertex to the destination vertex by selecting one or more consecutive path segments so as to minimize segment path lengths and vertex traffic potentials for each of the subset of the plurality of vertices.

2. The method of claim 1, further comprising providing navigation instructions to the VR device, with the navigation instructions based on the navigable path, wherein the navigation instructions are combined with VR content for the VR device.

3. The method of claim 1, wherein each edge of the plurality of edges within the graph model is characterized by an edge width indicative of a maximum number of VR devices that can be present on the respective path segment represented by the edge.

4. The method of claim 1, wherein a vertex traffic potential is computed for all vertices connected to a particular vertex by a single edge.

5. The method of claim 1, wherein the vertex traffic potential for the vertex comprises the number of VR devices present at the location corresponding to the vertex combined with a number of VR devices approaching the location.

6. The method of claim 1, wherein an edge of the plurality of edges is associated with at least one of a path segment length or a path segment capacity.

7. The method of claim 1, wherein selecting the one or more consecutive path segments further comprises selecting the one or more consecutive path segments according to path segment capacities.

8. The method of claim 1, further comprising providing navigation instructions to the VR device to navigate from a first vertex having a high vertex traffic potential to a second vertex having a low vertex traffic potential based on the navigable path.

9. The method of claim 1, wherein determining the navigable path further comprises determining a plurality of shortest paths between the source vertex and the destination vertex, wherein the plurality of shortest paths comprise paths having at least one of fewer vertices or fewer edges as compared to other paths between the source vertex and the destination vertex.

10. The method of claim 1, further comprising sorting the plurality of navigable paths to determine the subset of the plurality of vertices, the plurality of navigable paths sorted according to a respective path weight of the plurality of weights for each navigable path of the plurality of navigable paths.

11. The method of claim 10, further comprising sorting the plurality of navigable paths from lowest path weight to highest path weight to find k shortest navigable paths, wherein k is an integer greater than one.

12. The method of claim 1, providing navigation instructions to the VR device to move from a second vertex to a first vertex when a first vertex traffic potential is less than a second vertex traffic potential, or providing navigation instructions to the VR device to move from the first vertex to the second vertex when the second vertex traffic potential is less than the first vertex traffic potential.

13. A virtual reality (VR) device, comprising:
a non-transitory memory storage comprising instructions; and
one or more processors in communication with the non-transitory memory storage, wherein the one or more processors execute the instructions to:
obtain a graph model comprising a plurality of vertices of a navigable space including a source vertex and a destination vertex for the VR device, the graph model comprising a plurality of edges, wherein each vertex represents a respective point within the navigable space, wherein each edge represents a respective path segment between two corresponding vertices, and wherein at least a portion of the plurality of edges represent multiple path segments coupled to a single vertex and associated with different navigable paths between the source and destination vertices;
determine a plurality of weights assigned to the plurality of edges, each of the plurality of weights indicative of a distance between corresponding vertices of an edge;
determine a subset of the plurality of vertices of the graph model for a navigable path of a plurality of navigable paths associated with the plurality of edges, based on the plurality of weights;
compute a vertex traffic potential for each vertex of the subset of the plurality of vertices, the vertex traffic potential comprising a respective number of VR devices present at a respective location corresponding to the vertex, wherein the computing further includes dynamically adjusting the vertex traffic potential for a particular vertex of the subset of the plurality of vertices based on in-flow and out-flow of the VR devices from the particular vertex; and
determine the navigable path from the source vertex to the destination vertex by selecting one or more consecutive path segments so as to minimize segment path lengths and vertex traffic potentials for each of the subset of the plurality of vertices.

14. The VR device of claim 13, wherein the one or more processors execute the instructions to provide navigation instructions to the VR device, with the navigation instructions based on the navigable path.

15. The VR device of claim 14, wherein the navigation instructions are combined with VR content for the VR device.

16. The VR device of claim 13, wherein the one or more processors execute the instructions to compute a vertex traffic potential for all vertices connected to a particular vertex by a single edge.

17. The VR device of claim 13, wherein the vertex traffic potential for the vertex comprises the number of VR devices present at the location corresponding to the vertex combined with a number of VR devices approaching the location.

18. The VR device of claim 13, wherein an edge of the plurality of edges is associated with at least one of a path segment length or a path segment capacity.

19. The VR device of claim 13, wherein selecting the one or more consecutive path segments further comprises selecting the one or more consecutive path segments according to path segment capacities.

20. The VR device of claim 13, wherein the one or more processors execute the instructions to provide navigation instructions to the VR device to navigate from a first vertex having a high vertex traffic potential to a second vertex having a low vertex traffic potential based on the navigable path.

21. The VR device of claim 13, wherein the one or more processors execute the instructions to determine a plurality of shortest paths between the source vertex and the destination vertex, wherein the plurality of shortest paths comprise paths having at least one of fewer vertices or fewer edges as compared to other paths between the source vertex and the destination vertex.

22. The VR device of claim 13, wherein the one or more processors execute the instructions to sort the plurality of navigable paths to determine the subset of the plurality of vertices, the plurality of navigable paths sorted according to a respective path weight of the plurality of weights for each navigable path of the plurality of navigable paths.

23. The VR device of claim 22, wherein the one or more processors execute the instructions to sort the plurality of navigable paths from lowest path weight to highest path weight to find k shortest navigable paths, wherein k is an integer greater than one.

24. The VR device of claim 13, wherein the one or more processors execute the instructions to provide navigation instructions to the VR device to move from a second vertex to a first vertex when a first vertex traffic potential is less than a second vertex traffic potential, or provide navigation instructions to the VR device to move from the first vertex to the second vertex when the second vertex traffic potential is less than the first vertex traffic potential.

25. A non-transitory computer-readable media storing computer instructions for collective navigation for distributed virtual reality (VR) devices, that when executed by one or more processors, cause the one or more processors to perform the steps of:
obtain a graph model comprising a plurality of vertices of a navigable space including a source vertex and a destination vertex for a VR device, the graph model comprising a plurality of edges, wherein each vertex represents a respective point within the navigable space, wherein each edge represents a respective path segment between two corresponding vertices, and wherein at least a portion of the plurality of edges represent multiple path segments coupled to a single vertex and associated with different navigable paths between the source and destination vertices;

determine a plurality of weights assigned to the plurality of edges, each of the plurality of weights indicative of a distance between corresponding vertices of an edge;

determine a subset of the plurality of vertices of the graph model for a navigable path of a plurality of navigable paths associated with the plurality of edges, based on the plurality of weights;

compute a vertex traffic potential for each vertex of the subset of the plurality of vertices, the vertex traffic potential comprising a respective number of VR devices present at a respective location corresponding to the vertex, wherein the computing further includes dynamically adjusting the vertex traffic potential for a particular vertex of the subset of the plurality of vertices based on in-flow and out-flow of the VR devices from the particular vertex; and determine the navigable path from the source vertex to the destination vertex by selecting one or more consecutive path segments so as to minimize segment path lengths and vertex traffic potentials for each of the subset of the plurality of vertices.

* * * * *